US012561420B2

(12) United States Patent
Gupta

(10) Patent No.: US 12,561,420 B2
(45) Date of Patent: *Feb. 24, 2026

(54) SYSTEM AND METHOD FOR AUTHENTICATING USERS VIA PATTERN BASED DIGITAL RESOURCES ON A DISTRIBUTED DEVELOPMENT PLATFORM

(71) Applicant: BANK OF AMERICA CORPORATION, Charlotte, NC (US)

(72) Inventor: Saurabh Gupta, New Delhi (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 590 days.

This patent is subject to a terminal disclaimer.

(21) Appl. No.: 17/671,932

(22) Filed: Feb. 15, 2022

(65) Prior Publication Data

US 2023/0259604 A1    Aug. 17, 2023

(51) Int. Cl.
| | |
|---|---|
| *G06F 21/36* | (2013.01) |
| *G06F 9/50* | (2006.01) |
| *G06F 21/35* | (2013.01) |
| *G06F 21/60* | (2013.01) |

(52) U.S. Cl.
CPC ............ *G06F 21/36* (2013.01); *G06F 9/5016* (2013.01); *G06F 21/35* (2013.01); *G06F 21/602* (2013.01)

(58) Field of Classification Search
None
See application file for complete search history.

(56) References Cited

U.S. PATENT DOCUMENTS

| | | | |
|---|---|---|---|
| 7,584,886 B2 | 9/2009 | Labaton | |
| 7,886,346 B2 | 2/2011 | Sandhu et al. | |
| 7,992,005 B2 | 8/2011 | Torres et al. | |
| 8,191,126 B2 | 5/2012 | Raghavan | |
| 8,618,402 B2 | 12/2013 | Rutledge et al. | |
| 10,026,118 B2 | 7/2018 | Castinado et al. | |
| 10,078,741 B2 | 9/2018 | Satyavarapu et al. | |
| 10,081,334 B1 | 9/2018 | Chen et al. | |
| 10,142,312 B2 | 11/2018 | Johnsrud et al. | |
| 10,666,442 B2 | 5/2020 | Anglin et al. | |
| 11,461,437 B1 * | 10/2022 | LaMontagne | ........... G06F 21/64 |
| 2014/0201831 A1 | 7/2014 | Yi et al. | |
| 2015/0294096 A1 * | 10/2015 | Grigg | ...................... H04L 63/08 |
| | | | 726/5 |
| 2016/0098549 A1 * | 4/2016 | Grigg | .................... H04W 12/06 |
| | | | 726/19 |

(Continued)

*Primary Examiner* — Syed A Roni

(74) *Attorney, Agent, or Firm* — Moore & Van Allen PLLC; Anoohya Yarlagadda

(57) ABSTRACT

Embodiments of the present invention provide a system for authenticating users via pattern based digital resources on a distributed development platform. In particular, the system may be configured to allow a user to create a pattern based digital resource, store the pattern based digital resource in an entity database associated with an entity system of an entity, determine that the user is initiating a real-time interaction using an interaction channel, prompt the user to provide a real-time pattern based digital resource via a component of a device associated with the interaction channel, verify the real-time pattern based digital resource received from the user, and authenticate the user to complete the real-time interaction via the interaction channel.

17 Claims, 5 Drawing Sheets

(56)                    References Cited

U.S. PATENT DOCUMENTS

| | | | |
|---|---|---|---|
| 2016/0162672 A1* | 6/2016 | Grigg | ...................... G06F 21/35 |
| | | | 726/7 |
| 2017/0063851 A1* | 3/2017 | Kim | ................... H04W 12/065 |
| 2020/0167775 A1 | 5/2020 | Reese et al. | |
| 2020/0358614 A1 | 11/2020 | Fiske | |
| 2021/0294887 A1 | 9/2021 | Pike | |
| 2021/0398091 A1 | 12/2021 | Yan | |

* cited by examiner

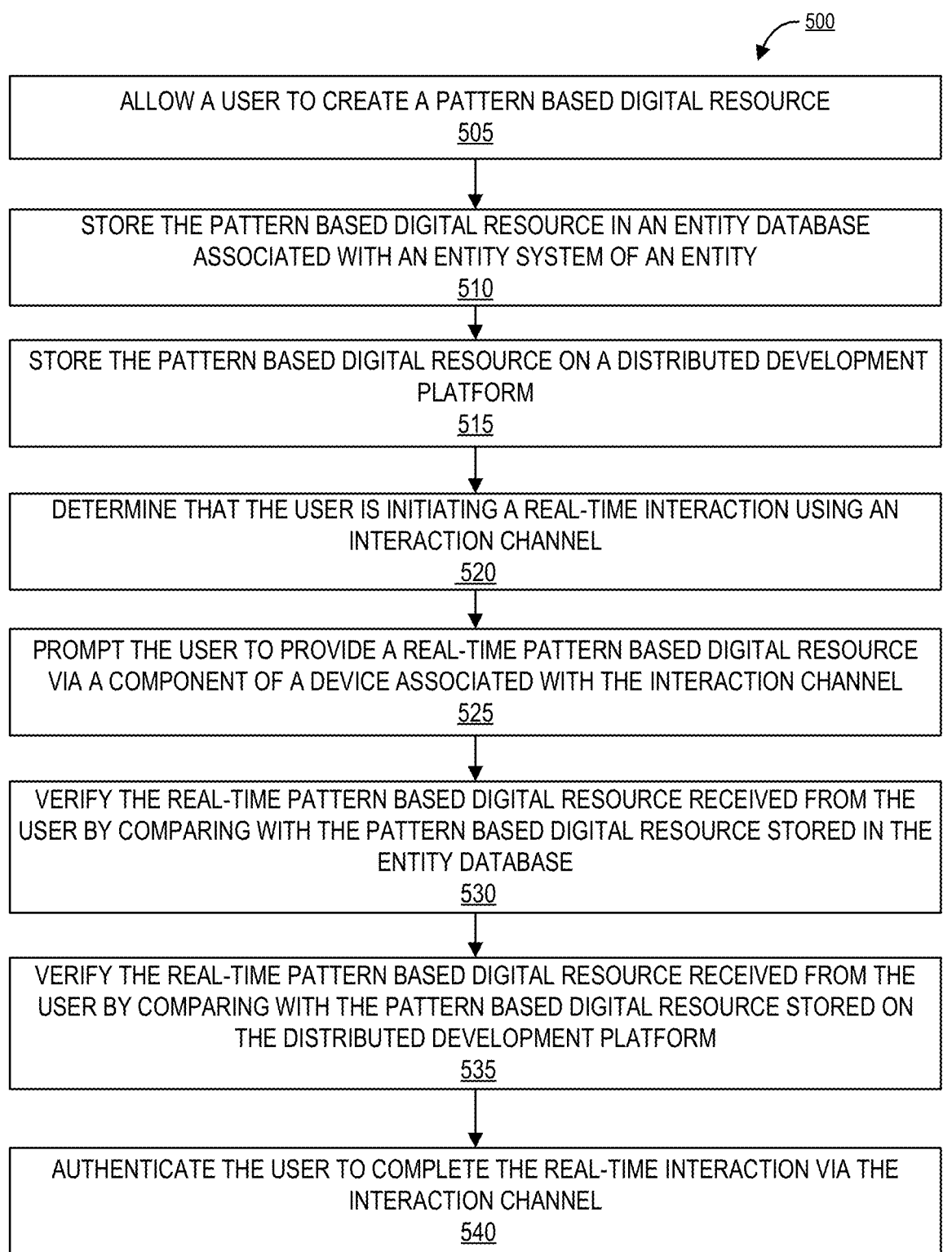

500

ALLOW A USER TO CREATE A PATTERN BASED DIGITAL RESOURCE
505

STORE THE PATTERN BASED DIGITAL RESOURCE IN AN ENTITY DATABASE ASSOCIATED WITH AN ENTITY SYSTEM OF AN ENTITY
510

STORE THE PATTERN BASED DIGITAL RESOURCE ON A DISTRIBUTED DEVELOPMENT PLATFORM
515

DETERMINE THAT THE USER IS INITIATING A REAL-TIME INTERACTION USING AN INTERACTION CHANNEL
520

PROMPT THE USER TO PROVIDE A REAL-TIME PATTERN BASED DIGITAL RESOURCE VIA A COMPONENT OF A DEVICE ASSOCIATED WITH THE INTERACTION CHANNEL
525

VERIFY THE REAL-TIME PATTERN BASED DIGITAL RESOURCE RECEIVED FROM THE USER BY COMPARING WITH THE PATTERN BASED DIGITAL RESOURCE STORED IN THE ENTITY DATABASE
530

VERIFY THE REAL-TIME PATTERN BASED DIGITAL RESOURCE RECEIVED FROM THE USER BY COMPARING WITH THE PATTERN BASED DIGITAL RESOURCE STORED ON THE DISTRIBUTED DEVELOPMENT PLATFORM
535

AUTHENTICATE THE USER TO COMPLETE THE REAL-TIME INTERACTION VIA THE INTERACTION CHANNEL
540

FIG. 5

SYSTEM AND METHOD FOR AUTHENTICATING USERS VIA PATTERN BASED DIGITAL RESOURCES ON A DISTRIBUTED DEVELOPMENT PLATFORM

BACKGROUND

There exists a need for a system to provide a improved and effective way of authenticating users.

BRIEF SUMMARY

The following presents a summary of certain embodiments of the invention. This summary is not intended to identify key or critical elements of all embodiments nor delineate the scope of any or all embodiments. Its sole purpose is to present certain concepts and elements of one or more embodiments in a summary form as a prelude to the more detailed description that follows.

Embodiments of the present invention address the above needs and/or achieve other advantages by providing apparatuses (e.g., a system, computer program product and/or other devices) and methods for authenticating users via pattern based digital resources on a distributed development platform. The system embodiments may comprise one or more memory devices having computer readable program code stored thereon, a communication device, and one or more processing devices operatively coupled to the one or more memory devices, wherein the one or more processing devices are configured to execute the computer readable program code to carry out the invention. In computer program product embodiments of the invention, the computer program product comprises at least one non-transitory computer readable medium comprising computer readable instructions for carrying out the invention. Computer implemented method embodiments of the invention may comprise providing a computing system comprising a computer processing device and a non-transitory computer readable medium, where the computer readable medium comprises configured computer program instruction code, such that when said instruction code is operated by said computer processing device, said computer processing device performs certain operations to carry out the invention.

In some embodiments, the present invention allows a user to create a pattern based digital resource, stores the pattern based digital resource in an entity database associated with an entity system of an entity, determines that the user is initiating a real-time interaction using an interaction channel, prompt the user to provide a real-time pattern based digital resource via a component of a device associated with the interaction channel, verify the real-time pattern based digital resource received from the user, and authenticate the user to complete the real-time interaction via the interaction channel.

In some embodiments, the present invention stores the pattern based digital resource on a distributed development platform.

In some embodiments, the present invention verifies the pattern based digital resource received from the user based on at least one of comparing the real-time pattern based digital resource received from the user with the pattern based digital resource stored in the entity database, and comparing the real-time pattern based digital resource received from the user with the pattern based digital resource stored on the distributed development platform, via a distributed development platform controller.

In some embodiments, the interaction channel comprises at least one of an online channel, a resource entity channel, and a third party entity channel.

In some embodiments, the device associated with the online channel is a user device, wherein the device associated with the resource entity channel is a resource entity device, and wherein the device associated with the third party entity channel is a third party entity device.

In some embodiments, the pattern based digital resource is a music pattern based digital resource.

In some embodiments, the present invention verifies the real-time pattern based digital resource received from the user based on comparing number of keys used to create the music pattern based digital resource with real-time number of keys associated with the real-time pattern based digital resource, comparing frequency associated with music pattern based digital resource with real-time frequency associated with the real-time pattern based digital resource, and comparing delay associated the music pattern based digital resource with real-time delay associated with the real-time pattern based digital resource.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
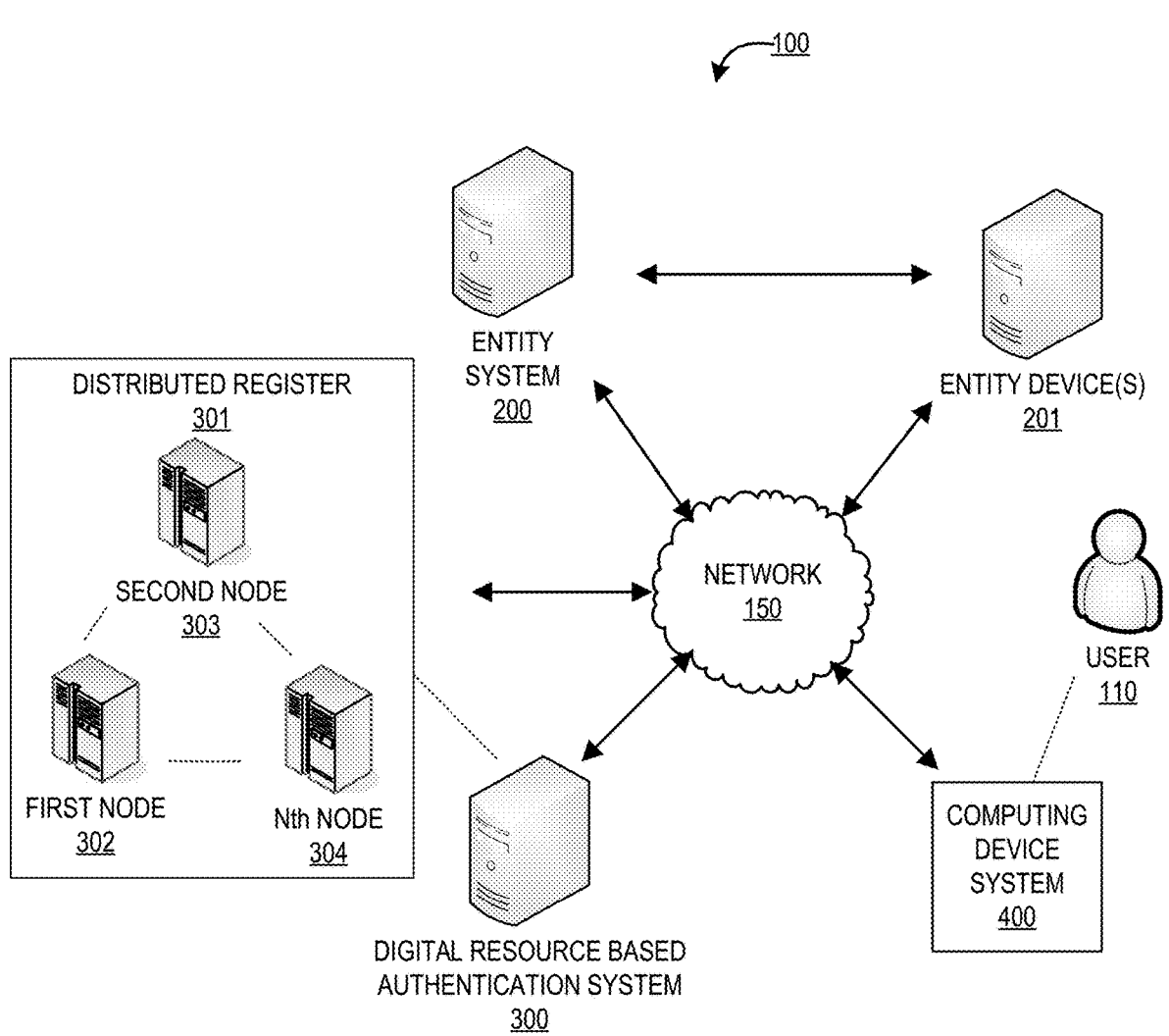
Figure 2:
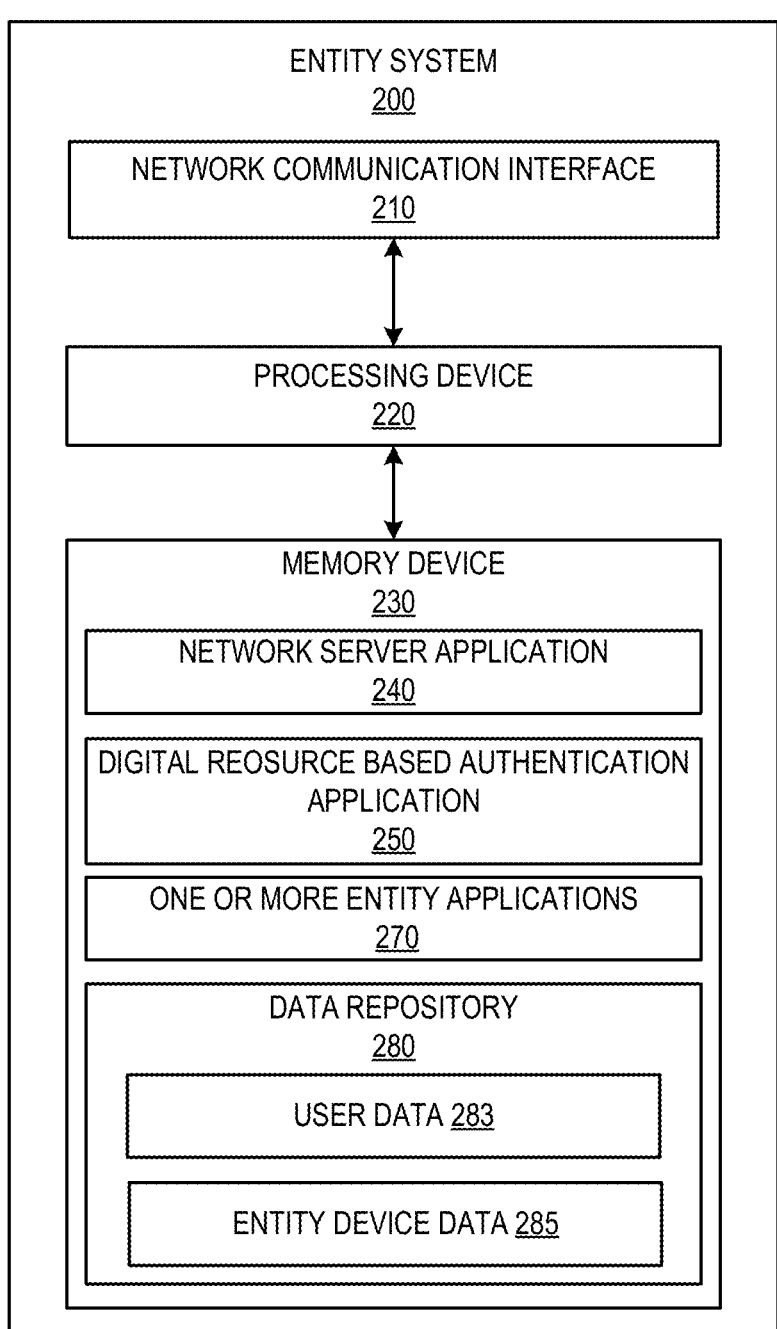
Figure 3:
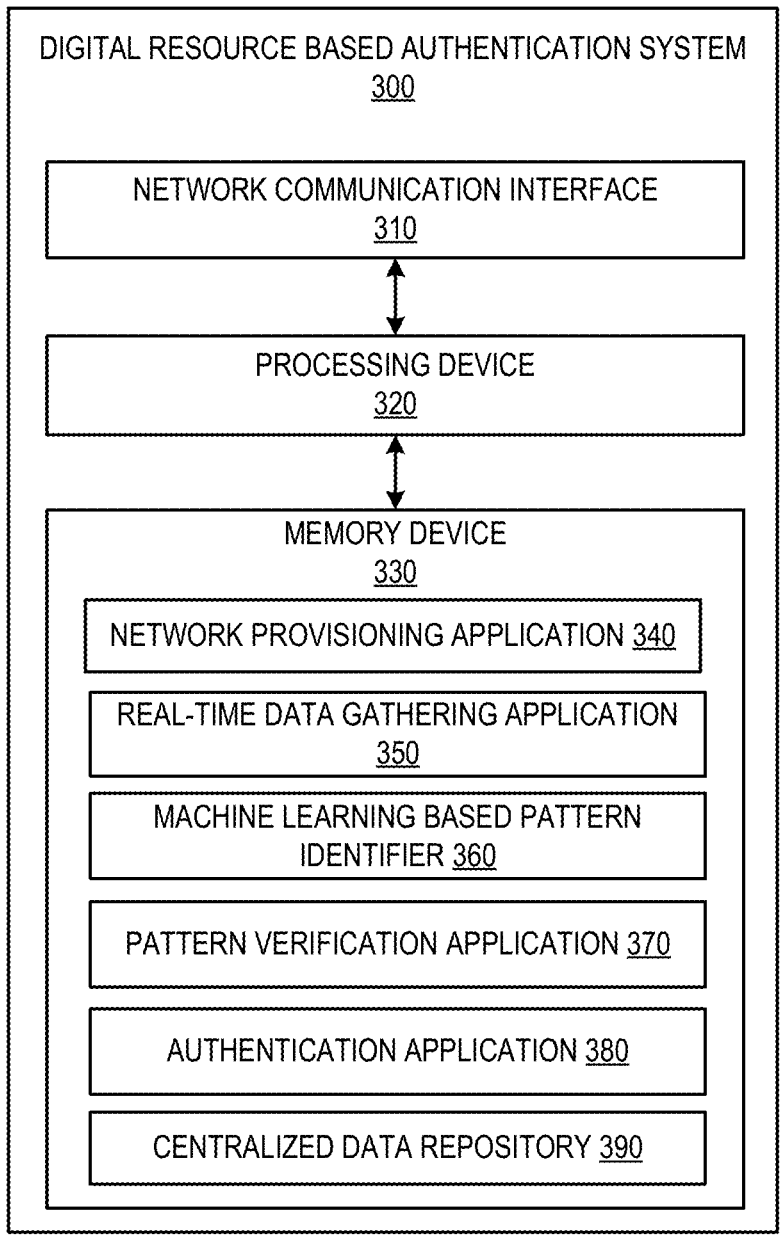
Figure 4:
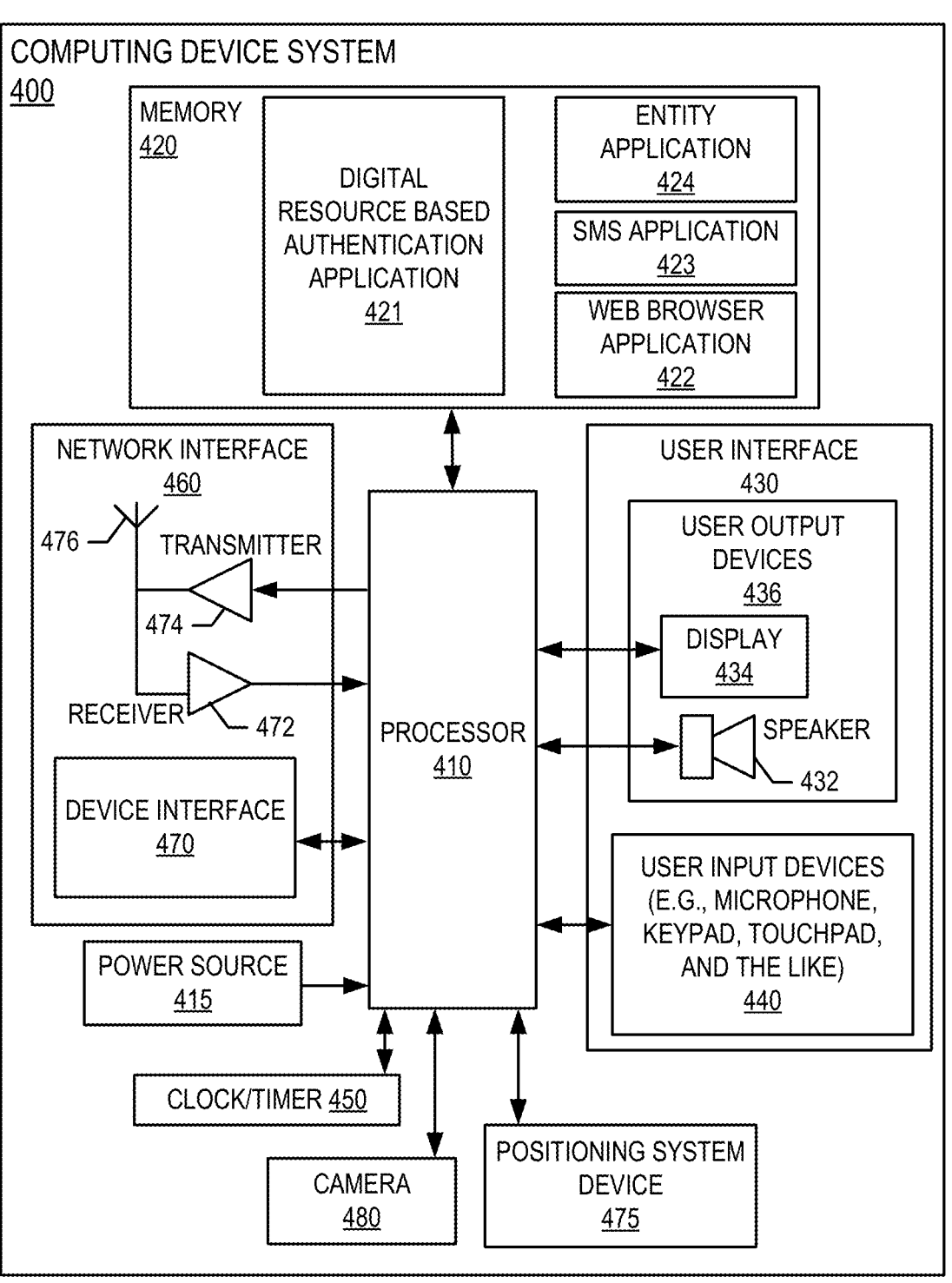

Having thus described embodiments of the invention in general terms, reference will now be made the accompanying drawings, wherein:

FIG. 1 provides a block diagram illustrating a system environment for authenticating users via pattern based digital resources on a distributed development platform, in accordance with an embodiment of the invention;

FIG. 2 provides a block diagram illustrating the entity system 200 of FIG. 1, in accordance with an embodiment of the invention;

FIG. 3 provides a block diagram illustrating an digital resource based authentication system 300 of FIG. 1, in accordance with an embodiment of the invention;

FIG. 4 provides a block diagram illustrating the computing device system 400 of FIG. 1, in accordance with an embodiment of the invention; and FIG. 5 provides a block diagram illustrating a process flow for authenticating users via pattern based digital resources on a distributed development platform, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, the term "resource entity" or "entity" may be any institution which involves in financial transactions. In one embodiment, the term "entity" or "resource entity" may be any financial institution. As used herein, the term "entity device" may be any device associated with the entity that allows users to perform one or more interactions/transactions associated with resource pools of the users. In some embodiments of the present invention, the "entity device" or a "resource entity device" may be an automated machine. In some embodiments, the "automated machine" may be any automated device that is involved in distribution of resources such as cash, checks, electronic transfers, money orders or the like which may be performed using a credit card, a debit card, or the like. In one embodiment of the present invention, the automated machine may be an Automated Teller Machine (ATM). In some embodiments, the "automated machine" may be any automated device that provides information associated with resource pools of the user. In some embodiments, the automated machine may be owned and/or controlled by the resource entity. In some embodiments, a "third party entity device" may be a Point of Sale (POS) device.

As described herein, a "user" may be a customer or a potential customer of the entity. In some embodiments, a "user" may be a financial institution customer (e.g., an account holder or a person who has an account (e.g., banking account, credit account, or the like)). An "account" or "resource pool" may be the relationship that the customer has with the financial institution. Examples of accounts include a deposit account, such as a transactional account (e.g. a banking account), a savings account, an investment account, a money market account, a time deposit, a demand deposit, a pre-paid account, a credit account, a non-monetary customer information that includes only personal information associated with the customer, or the like. The account is associated with and/or maintained by a financial institution.

A "system environment", as used herein, may refer to any information technology platform of an enterprise (e.g., a national or multi-national corporation) and may include a multitude of servers, machines, mainframes, personal computers, network devices, front and back end systems, database system and/or the like.

"Distributed register," or "distributed development platform" as used herein may also be referred to as a "distributed ledger," as used herein may refer to a structured list of data records that is decentralized and distributed amongst a plurality of computing systems and/or devices. In some embodiments, the distributed ledger may use a linked block structure.

"Linked block," "linked block structure," "linked structure," or "blockchain" as used herein may refer to a data structure which may comprise a series of sequentially linked "blocks," where each block may comprise data and metadata. The "data" within each block may comprise one or more "data record" or "transactions," while the "metadata" within each block may comprise information about the block, which may include a timestamp, a hash value of data records within the block, a pointer (e.g., a hash value) to the previous block in the linked block structure, and/or any additional data created by the system of the present invention. In this way, beginning from an originating block (e.g., a "genesis block"), each block in the linked block structure is linked to another block via the pointers within the block headers. If the data or metadata within a particular block in the linked block structure becomes corrupted or modified, the hash values found in the header of the affected block and/or the downstream blocks may become mismatched, thus allowing the system to detect that the data has been corrupted or modified. In some embodiments of the present invention, a user may submit data associated with the creation of a new block associated with the linked block structure. For example, a user may initiate a transaction, where the data associated with the transaction is stored in a new block linked with the transaction.

A "linked block ledger" may refer to a distributed ledger which uses linked block data structures. Generally, a linked block ledger is an "append only" ledger in which the data within each block within the linked block ledger may not be modified after the block is added to the linked block ledger; data may only be added in a new block to the end of the linked block ledger. In this way, the linked block ledger may provide a practically immutable ledger of data records over time.

"Permissioned distributed ledger" as used herein may refer to a linked block ledger for which an access control mechanism is implemented such that only known, authorized users may take certain actions with respect to the linked block ledger (e.g., add new data records, participate in the consensus mechanism, or the like). Accordingly, "unpermissioned distributed ledger" as used herein may refer to a linked block ledger without an access control mechanism.

"Private distributed ledger" as used herein may refer to a linked block ledger accessible only to users or devices that meet specific criteria (e.g., authorized users or devices of a certain entity or other organization). Accordingly, a "public distributed ledger" is a linked block ledger accessible by any member or device in the public realm. In some embodiments of the present invention, the distributed ledger being described herein may be a permissioned distributed ledger. In some embodiments of the present invention, the distributed ledger being described herein may be a private distributed ledger.

"Node" as used herein may refer to a computing system on which the distributed ledger is hosted. In some embodiments, each node maintains a full copy of the distributed ledger. In this way, even if one or more nodes become unavailable or offline, a full copy of the distributed ledger may still be accessed via the remaining nodes in the distributed ledger system. That said, in some embodiments, the nodes may host a hybrid distributed ledger such that certain nodes may store certain segments of the linked block ledger but not others.

"Consensus," "consensus algorithm," or "consensus mechanism" as used herein may refer to the process or processes by which nodes come to an agreement with respect to the contents of the distributed ledger. Changes to the ledger (e.g., addition of data records) may require consensus to be reached by the nodes in order to become a part of the authentic version of the ledger. In this way, the consensus mechanism may ensure that each node maintains a copy of the distributed ledger that is consistent with the copies of the distributed ledger hosted on the other nodes; if the copy of the distributed ledger hosted on one node becomes corrupted or compromised, the remaining nodes may use the consensus algorithm to determine the "true" version of the distributed ledger. The nodes may use various different mechanisms or algorithms to obtain consensus, such as proof-of-work ("PoW"), proof-of-stake ("PoS"), practical byzantine fault tolerance ("PBFT"), proof-of-authority ("PoA"), or the like.

"Smart contract" as used herein may refer to executable computer code or logic that may be executed according to an agreement between parties upon the occurrence of a condition precedent (e.g., a triggering event such as the receipt of a proposed data record). In some embodiments, the smart contract may be self-executing code that is stored in the distributed ledger, where the self-executing code may be executed when the condition precedent is detected by the system on which the smart contract is stored.

In accordance with embodiments of the invention, "digital resources" may be Non-Fungible Tokens (NFTs), where NFT is a unit of data used a unique digital identifier stored on a distributed register that certifies ownership and authenticity of a digital artifact. As such, NFTs are stored in a distributed ledger—a database that is consensually shared and synchronized across multiple sites, institutions, or geographies, accessible by multiple people. Distributed ledgers use independent computers (referred to as nodes) to record, share and synchronize transactions in their respective electronic ledgers (instead of keeping data centralized as in a traditional ledger). In accordance with embodiments of the present invention, NFTs are created when a distributed ledger (e.g., blockchain) string records of cryptographic hash, a set of characters that verifies a set of data to be unique, onto previous records therefore creating a chain of identifiable data artifacts. This cryptographic transaction process ensures the authentication of each digital file by providing a digital signature that is used to track NFT ownership.

A "user interface" is any device or software that allows a user to input information, such as commands or data, into a device, or that allows the device to output information to the user. For example, the user interface includes a graphical user interface (GUI) or an interface to input computer-executable instructions that direct a processing device to carry out specific functions. The user interface typically employs certain input and output devices to input data received from a user or to output data to a user. These input and output devices may include a display, mouse, keyboard, button, touchpad, touch screen, microphone, speaker, LED, light, joystick, switch, buzzer, bell, and/or other user input/output device for communicating with one or more users.

FIG. 1 provides a block diagram illustrating a system environment 100 for authenticating users via pattern based digital resources on a distributed development platform, in accordance with an embodiment of the invention. As illustrated in FIG. 1, the environment 100 includes an digital resource based authentication system 300, entity system 200, one or more entity devices 201, a distributed register 301, and a computing device system 400. One or more users 110 may be included in the system environment 100, where the users 110 interact with the other entities of the system environment 100 via a user interface of the computing device system 400. In some embodiments, the one or more user(s) 110 of the system environment 100 may be customers of an entity associated with the entity system 200, where the entity maintains and/or manages one or more resource pools (e.g., checking account, savings account, or the like) associated with the users 110.

The entity system(s) 200 may be any system owned or otherwise controlled by an entity to support or perform one or more process steps described herein. In some embodiments, the entity is a financial institution. In some embodiments, the one or more entity devices 201 may be owned, operated, controlled, and/or maintained by the entity. Examples of the one or more entity devices may include, but are not limited to, Automated Teller Machines, Point of Sale devices, online servers, or the like that allows users 110 to perform one or more interactions associated with resource pools of the users 110.

The digital resource based authentication system 300 is a system of the present invention for performing one or more process steps described herein. In some embodiments, the digital resource based authentication system 300 may be an independent system. In some embodiments, the digital resource based authentication system 300 may be a part of the entity system 200.

In some embodiments, the distributed register 301 comprises one or more nodes (e.g., first node 302, second node 303, through nth node). In some embodiments, the distributed register 301 may be a private distributed register associated with the entity. In some embodiments, the distributed register 301 may be a public distributed register. In some embodiments, one or more of the digital resource based authentication system 300, the entity system 200, the entity devices 201, and the computing device system 400 may be one or more nodes of the distributed register 301.

The digital resource based authentication system 300, the entity system 200, and the computing device system 400 may be in network communication across the system environment 100 through the network 150. The network 150 may include a local area network (LAN), a wide area network (WAN), and/or a global area network (GAN). The network 150 may provide for wireline, wireless, or a combination of wireline and wireless communication between devices in the network. In one embodiment, the network 150 includes the Internet. In general, the digital resource based authentication system 300 is configured to communicate information or instructions with the entity system 200, and/or the computing device system 400 across the network 150.

The computing device system 400 may be a system owned or controlled by the entity of the entity system 200 and/or the user 110. As such, the computing device system 400 may be a computing device of the user 110. In general, the computing device system 400 communicates with the user 110 via a user interface of the computing device system 400, and in turn is configured to communicate information or instructions with the digital resource based authentication system 300, and/or entity system 200 across the network 150. In some embodiments of the invention, the computing device system 400 may be a mobile device.

FIG. 2 provides a block diagram illustrating the entity system 200, in greater detail, in accordance with embodiments of the invention. As illustrated in FIG. 2, in one embodiment of the invention, the entity system 200 includes one or more processing devices 220 operatively coupled to a network communication interface 210 and a memory device 230. In certain embodiments, the entity system 200 is operated by a first entity, such as a financial institution, while in other embodiments, the entity system 200 is operated by an entity other than a financial institution.

It should be understood that the memory device 230 may include one or more databases or other data structures/repositories. The memory device 230 also includes computer-executable program code that instructs the processing device 220 to operate the network communication interface 210 to perform certain communication functions of the entity system 200 described herein. For example, in one embodiment of the entity system 200, the memory device 230 includes, but is not limited to, an digital resource based authentication application 250, one or more entity applications 270, and a data repository 280 comprising user data 283 and entity device data 285, where the user data 283 comprises data associated with users 110 and/or one or more resource pools associated with the users 110 and the entity device data 285 comprises data associated with one or more entity devices. The one or more entity applications 270 may be any applications provided by the entity that allows users 110 to access information and/or perform one or more actions associated with one or more resource pools of the users 110. The computer-executable program code of the network server application 240, the digital resource based authentication application 250, the one or more entity application 270 to perform certain logic, data-extraction, and data-storing functions of the entity system 200 described herein, as well as communication functions of the entity system 200.

The network server application 240, the digital resource based authentication application 250, and the one or more entity applications 270 are configured to store data in the data repository 280 or to use the data stored in the data repository 280 when communicating through the network communication interface 210 with the digital resource based authentication system 300, and/or the computing device system 400 to perform one or more process steps described herein. In some embodiments, the entity system 200 may receive instructions from the digital resource based authentication system 300 via the digital resource based authentication application 250 to perform certain operations. The digital resource based authentication application 250 may be provided by the digital resource based authentication system 300.

FIG. 3 provides a block diagram illustrating the digital resource based authentication system 300 in greater detail, in accordance with embodiments of the invention. As illustrated in FIG. 3, in one embodiment of the invention, the digital resource based authentication system 300 includes one or more processing devices 320 operatively coupled to a network communication interface 310 and a memory device 330. In certain embodiments, the digital resource based authentication system 300 is operated by a first entity, such as a financial institution, while in other embodiments, the digital resource based authentication system 300 is operated by an entity other than a financial institution. In some embodiments, the digital resource based authentication system 300 is owned or operated by the entity of the entity system 200. In some embodiments, the digital resource based authentication system 300 may be an independent system. In alternate embodiments, the digital resource based authentication system 300 may be a part of the entity system 200.

It should be understood that the memory device 330 may include one or more databases or other data structures/repositories. The memory device 330 also includes computer-executable program code that instructs the processing device 320 to operate the network communication interface 310 to perform certain communication functions of the digital resource based authentication system 300 described herein. For example, in one embodiment of the digital resource based authentication system 300, the memory device 330 includes, but is not limited to, a network provisioning application 340, a real-time data gathering application 350, a machine learning based pattern identifier 360, a pattern verification application 370, an authentication application 380, and a centralized data repository 390 comprising data processed or accessed by one or more applications in the memory device 330. The computer-executable program code of the network provisioning application 340, the real-time data gathering application 350, the machine learning based pattern identifier 360, the pattern verification application 370, and the authentication application 380 may instruct the processing device 320 to perform certain logic, data-processing, and data-storing functions of the digital resource based authentication system 300 described herein, as well as communication functions of the digital resource based authentication system 300.

The network provisioning application 340, the real-time data gathering application 350, the machine learning based pattern identifier 360, the pattern verification application 370, and the authentication application 380 are configured to invoke or use the data in the data repository 390 when communicating through the network communication interface 310 with the entity system 200, and/or the computing device system 400. In some embodiments, the network provisioning application 340, the real-time data gathering application 350, the machine learning based pattern identifier 360, the pattern verification application 370, and the authentication application 380 may store the data extracted or received from the entity system 200, and the computing device system 400 in the centralized data repository 390. In some embodiments, the network provisioning application 340, the real-time data gathering application 350, the machine learning based pattern identifier 360, the pattern verification application 370, and the authentication application 380 may be a part of a single application. The functionalities of the network provisioning application 340, the real-time data gathering application 350, the machine learning based pattern identifier 360, the pattern verification application 370, and the authentication application 380 are explained in greater detail in FIG. 5.

FIG. 4 provides a block diagram illustrating a computing device system 400 of FIG. 1 in more detail, in accordance with embodiments of the invention. However, it should be understood that a mobile telephone is merely illustrative of one type of computing device system 400 that may benefit from, employ, or otherwise be involved with embodiments of the present invention and, therefore, should not be taken to limit the scope of embodiments of the present invention. Other types of computing devices may include portable digital assistants (PDAs), pagers, mobile televisions, cameras, video recorders, audio/video player, radio, GPS devices, wearable devices, Internet-of-things devices, augmented reality devices, virtual reality devices, automated teller machine devices, electronic kiosk devices, or any combination of the aforementioned.

Some embodiments of the computing device system 400 include a processor 410 communicably coupled to such devices as a memory 420, user output devices 436, user input devices 440, a network interface 460, a power source 415, a clock or other timer 450, a camera 480, and a positioning system device 475. The processor 410, and other processors described herein, generally include circuitry for implementing communication and/or logic functions of the computing device system 400. For example, the processor 410 may include a digital signal processor device, a microprocessor device, and various analog to digital converters, digital to analog converters, and/or other support circuits. Control and signal processing functions of the computing device system 400 are allocated between these devices according to their respective capabilities. The processor 410 thus may also include the functionality to encode and interleave messages and data prior to modulation and transmission. The processor 410 can additionally include an internal data modem. Further, the processor 410 may include functionality to operate one or more software programs, which may be stored in the memory 420. For example, the processor 410 may be capable of operating a connectivity program, such as a web browser application 422. The web browser application 422 may then allow the computing device system 400 to transmit and receive web content, such as, for example, location-based content and/or other web page content, according to a Wireless Application Protocol (WAP), Hypertext Transfer Protocol (HTTP), and/or the like.

The processor 410 is configured to use the network interface 460 to communicate with one or more other devices on the network 150. In this regard, the network interface 460 includes an antenna 476 operatively coupled to a transmitter 474 and a receiver 472 (together a "transceiver"). The processor 410 is configured to provide signals to and receive signals from the transmitter 474 and receiver 472, respectively. The signals may include signaling information in accordance with the air interface standard of the applicable cellular system of the wireless network 152. In this regard, the computing device system 400 may be configured to operate with one or more air interface standards, communication protocols, modulation types, and access types. By way of illustration, the computing device system 400 may be configured to operate in accordance with any of a number of first, second, third, and/or fourth-generation communication protocols and/or the like.

As described above, the computing device system 400 has a user interface that is, like other user interfaces described herein, made up of user output devices 436 and/or user input devices 440. The user output devices 436 include a display 430 (e.g., a liquid crystal display or the like) and a speaker 432 or other audio device, which are operatively coupled to the processor 410.

The user input devices 440, which allow the computing device system 400 to receive data from a user such as the user 110, may include any of a number of devices allowing the computing device system 400 to receive data from the user 110, such as a keypad, keyboard, touch-screen, touch-pad, microphone, mouse, joystick, other pointer device, button, soft key, and/or other input device(s). The user interface may also include a camera 480, such as a digital camera.

The computing device system 400 may also include a positioning system device 475 that is configured to be used by a positioning system to determine a location of the computing device system 400. For example, the positioning system device 475 may include a GPS transceiver. In some embodiments, the positioning system device 475 is at least partially made up of the antenna 476, transmitter 474, and receiver 472 described above. For example, in one embodiment, triangulation of cellular signals may be used to identify the approximate or exact geographical location of the computing device system 400. In other embodiments, the positioning system device 475 includes a proximity sensor or transmitter, such as an RFID tag, that can sense or be sensed by devices known to be located proximate a merchant or other location to determine that the computing device system 400 is located proximate these known devices.

The computing device system 400 further includes a power source 415, such as a battery, for powering various circuits and other devices that are used to operate the computing device system 400. Embodiments of the computing device system 400 may also include a clock or other timer 450 configured to determine and, in some cases, communicate actual or relative time to the processor 410 or one or more other devices.

The computing device system 400 also includes a memory 420 operatively coupled to the processor 410. As used herein, memory includes any computer readable medium (as defined herein below) configured to store data, code, or other information. The memory 420 may include volatile memory, such as volatile Random Access Memory (RAM) including a cache area for the temporary storage of data. The memory 420 may also include non-volatile memory, which can be embedded and/or may be removable. The non-volatile memory can additionally or alternatively include an electrically erasable programmable read-only memory (EEPROM), flash memory or the like.

The memory 420 can store any of a number of applications which comprise computer-executable instructions/code executed by the processor 410 to implement the functions of the computing device system 400 and/or one or more of the process/method steps described herein. For example, the memory 420 may include such applications as a conventional web browser application 422, a digital resource based authentication application 421, entity application 424, an SMS application 423, or the like. In some embodiments, the entity application 424 may be an online banking application. The digital resource based authentication application 421 may comprise instructions to a graphical user interface (GUI) on the display 430 that allows the user 110 to interact with the entity system 200, the digital resource based authentication system 300, and/or other devices or systems. The memory 420 of the computing device system 400 may comprise a Short Message Service (SMS) application 423 configured to send, receive, and store data, information, communications, alerts, and the like via the wireless telephone network 152. In some embodiments, the digital resource based authentication application 421 provided by the digital resource based authentication system 300 allows the user 110 to access the digital resource based authentication system 300. In some embodiments, the entity application 424 provided by the entity system 200 and the digital resource based authentication application 421 allow the user 110 to access the functionalities provided by the digital resource based authentication system 300 and the entity system 200. In some embodiments, the entity application 424 may be an online banking application.

The memory 420 can also store any of a number of pieces of information, and data, used by the computing device system 400 and the applications and devices that make up the computing device system 400 or are in communication with the computing device system 400 to implement the functions of the computing device system 400 and/or the other systems described herein.

FIG. 5 provides a block diagram illustrating a process flow 500 for authenticating users via pattern based digital resources on a distributed development platform, in accordance with an embodiment of the invention.

As shown in block 505, the system allows a user to create a pattern based digital resource. In some embodiments, the system may allow a user to create via any interaction channel. The interaction channel comprises at least one of an online channel, a resource entity channel, and a third party entity channel. In one embodiment, the system may allow a user to create a pattern based digital resource via a user interface provided by a screen of a user device (e.g., computing device system 400) associated with the online interaction channel. In another embodiment, the system may allow a user to create a pattern based digital resource via a keypad on a resource entity device (e.g., automated machine) associated with the resource entity interaction channel. In another embodiment, the system may allow a user to create a pattern based digital resource via a keypad on a third party entity device (e.g., Point of Sale device) associated with the third party entity interaction channel.

In some embodiments, the pattern based digital resource may be a musical pattern Non-Fungible Token (also referred to as musical pattern digital resource). The musical pattern digital resource may be any pattern created by the user and is defined based on number of keys used to create the pattern, usage of the number of keys, frequency between the keys associated with the pattern, and delay between keys associated with the pattern. For example, a music pattern digital resource may be created using two keys, where first key of the two keys is used eight times and second key of the two keys is used two times and is defined by the frequency associated with the usage of the first key and the second key, and delay between each entry of the keys.

As shown in block 510, the system stores the pattern based digital resource in an entity database associated with an entity system of an entity. The entity database may be any database used by the entity system to store user data associated one or more users of the entity. An example of such a database is data repository 280 of FIG. 2. As shown in block 515, the system stores the pattern based digital resource on a distributed development platform. For example, the system stores the pattern based digital resource in the distributed register 301.

As shown in block 520, the system determines that the user is initiating a real-time interaction using the interaction channel. As explained above, the interaction channel comprises at least one of an online channel, a resource entity channel, and a third party entity channel.

As shown in block 525, the system prompts the user to provide a real-time pattern based digital resource via a component of a device associated with the interaction channel. In one embodiment, the system may allow a user to provide the real-time pattern based digital resource via a user interface provided by a screen of a user device (e.g., computing device system 400) associated with the online interaction channel. In another embodiment, the system may allow a user to provide the real-time pattern based digital resource via a keypad on a resource entity device (e.g., automated machine) associated with the resource entity interaction channel. In another embodiment, the system may allow the a user to provide the real-time pattern based digital resource via a keypad on a third party entity device (e.g., Point of Sale device) associated with the third party entity interaction channel.

As shown in block 530, the system verifies the real-time pattern based digital resource received from the user by comparing with the pattern based digital resource stored in the entity database. As shown in block 535, the system verifies the real-time pattern based digital resource received from the user by comparing with the pattern based digital resource stored on the distributed development platform. In some embodiments, the system may perform at least one of the steps described in block 530 and block 535. Verification of the real-time pattern based digital resource received from the user is performed based on comparing number of keys used to create the music pattern based digital resource with real-time number of keys associated with the real-time pattern based digital resource, comparing frequency associated with music pattern based digital resource with real-time frequency associated with the real-time pattern based digital resource, and comparing delay associated the music pattern based digital resource with real-time delay associated with the real-time pattern based digital resource.

As shown in block 540, the system authenticates the user to complete the real-time interaction via the interaction channel. Based on determining that the real-time pattern based digital resource matches the pattern based digital resource stored in the entity database and/or the distributed development platform, the system authenticates the user to complete the real-time interaction.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, and the like), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for authenticating users via pattern based non-fungible tokens on a distributed development platform, the system comprising:

a memory device with computer-readable program code stored thereon;

a communication device; and a processing device operatively coupled to the memory device and the communication device, wherein the processing device is configured to execute the computer-readable program code to:

allow a user to create a music pattern based non-fungible token;

store the music pattern based non-fungible token in an entity database associated with an entity system of an entity and a distributed development platform;

determine that the user is initiating a real-time interaction using an interaction channel, via a device associated with the interaction channel, wherein a type of the device is based on a type of the interaction channel;

prompt the user to provide a real-time music pattern based non-fungible token via a component of the device that is associated with the interaction channel;

verify the real-time music pattern based non-fungible token received from the user based on the music pattern based non-fungible token stored in the entity database and the distributed development platform, wherein verifying the real-time music pattern based non-fungible token comprises:

comparing number of keys used to create the music pattern based non- fungible token with real-time number of keys associated with the real-time music pattern based non-fungible token;

comparing frequency associated with music pattern based non-fungible token with real-time frequency associated with the real-time music pattern based non-fungible token; and comparing delay associated the music pattern based non-fungible token with real-time delay associated with the real-time music pattern based non-fungible token; and authenticate the user to complete the real-time interaction via the interaction channel.

2. The system according to claim 1, wherein the processing device is further configured to execute the computer-readable program code to verify the music pattern based non-fungible token received from the user based on:

comparing the real-time music pattern based non-fungible token received from the user with the music pattern based non-fungible token stored in the entity database; and comparing the real-time music pattern based non-fungible token received from the user with the music pattern based non-fungible token stored on the distributed development platform, via a distributed development platform controller.

3. The system according to claim 1, wherein the interaction channel is an online channel.

4. The system according to claim 1, wherein the interaction channel is a resource entity channel.

5. The system according to claim 4, wherein the component of the device associated with the interaction channel is a keypad or a digital screen of the device.

6. The system according to claim 1, wherein the interaction channel is a third party entity channel.

7. A computer program product for authenticating users via pattern based non-fungible tokens on a distributed development platform, the computer program product comprising at least one non-transitory computer readable medium having computer-readable program code portions embodied therein, the computer-readable program code portions comprising executable portions for:

allowing a user to create a music pattern based non-fungible token;

storing the music pattern based non-fungible token in an entity database associated with an entity system of an entity and a distributed development platform;

determining that the user is initiating a real-time interaction using an interaction channel, via a device associated with the interaction channel, wherein a type of the device is based on a type of the interaction channel;

prompting the user to provide a real-time music pattern based non-fungible token via a component of the device that is associated with the interaction channel;

verifying the real-time music pattern based non-fungible token received from the user based on the music pattern based non-fungible token stored in the entity database and the distributed development platform, wherein verifying the real-time music pattern based non-fungible token comprises:

comparing number of keys used to create the music pattern based non-fungible token with real-time number of keys associated with the real-time music pattern based non-fungible token;

comparing frequency associated with music pattern based non-fungible token with real-time frequency associated with the real-time music pattern based non-fungible token; and comparing delay associated the music pattern based non-fungible token with real-time delay associated with the real-time music pattern based non- fungible token; and authenticating the user to complete the real-time interaction via the interaction channel.

8. The computer program product of claim 7, wherein the computer- readable program code portions comprising executable portions for verifying the music pattern based non-fungible token received from the user based on:

comparing the real-time music pattern based non-fungible token received from the user with the music pattern based non-fungible token stored in the entity database; and comparing the real-time music pattern based non-fungible token received from the user with the music pattern based non-fungible token stored on the distributed development platform, via a distributed development platform controller.

9. The computer program product of claim 7, wherein the interaction channel is an online channel.

10. The computer program product of claim 7, wherein the interaction channel is a resource entity channel.

11. The computer program product of claim 10, wherein the component of the device associated with the interaction channel is a keypad or a digital screen of the device.

12. The computer program product of claim 7, wherein the interaction channel is a third party entity channel.

13. A computer-implemented method for authenticating users via pattern based non-fungible tokens on a distributed development platform, the method comprising:

allowing a user to create a music pattern based non-fungible token;

storing the music pattern based non-fungible token in an entity database associated with an entity system of an entity and a distributed development platform;

determining that the user is initiating a real-time interaction using an interaction channel, via a device associated with the interaction channel, wherein a type of the device is based on a type of the interaction channel;

prompting the user to provide a real-time music pattern based non-fungible token via a component of the device that is associated with the interaction channel;

verifying the real-time music pattern based non-fungible token received from the user based on the music pattern based non-fungible token stored in the entity database and the distributed development platform, wherein verifying the real-time music pattern based non-fungible token comprises:

comparing number of keys used to create the music pattern based non-fungible token with real-time number of keys associated with the real-time music pattern based non-fungible token;

comparing frequency associated with music pattern based non-fungible token with real-time frequency associated with the real-time music pattern based non-fungible token; and comparing delay associated the music pattern based non-fungible token with real-time delay associated with the real-time music pattern based non-fungible token; and authenticating the user to complete the real-time interaction via the interaction channel.

14. The computer-implemented method of claim 13, wherein verifying the music pattern based non-fungible token received from the user is based on:

comparing the real-time music pattern based non-fungible token received from the user with the music pattern based non-fungible token stored in the entity database; and comparing the real-time music pattern based non-fungible token received from the user with the music pattern based non-fungible token stored on the distributed development platform, via a distributed development platform controller.

15. The computer-implemented method of claim 13, wherein the interaction channel is an online channel.

16. The computer-implemented method of claim 13, wherein the interaction channel is a resource entity channel.

17. The computer-implemented method of claim 16, wherein the component of the device associated with the interaction channel is a keypad or a digital screen of the device.

* * * * *